(12) United States Patent
Howard et al.

(10) Patent No.: US 9,107,422 B2
(45) Date of Patent: Aug. 18, 2015

(54) AIRFLOW PATTERN FOR SPIRAL OVENS

(71) Applicant: Unitherm Food Systems, Inc., Bristow, OK (US)

(72) Inventors: David Howard, Bristow, OK (US); Austen Laur, Tulsa, OK (US)

(73) Assignee: Unitherm Food Systems, Inc., Bristow, OK (US)

( * ) Notice: Subject to any disclaimer, the term of this patent is extended or adjusted under 35 U.S.C. 154(b) by 0 days.

(21) Appl. No.: 13/708,393

(22) Filed: Dec. 7, 2012

(65) Prior Publication Data
US 2014/0120220 A1    May 1, 2014

Related U.S. Application Data

(63) Continuation-in-part of application No. 13/044,370, filed on Mar. 9, 2011.

(51) Int. Cl.
*F24C 15/32* (2006.01)
*A21B 1/40* (2006.01)
*A21B 1/48* (2006.01)
*A21B 1/26* (2006.01)

(52) U.S. Cl.
CPC ... *A21B 1/40* (2013.01); *A21B 1/26* (2013.01); *A21B 1/48* (2013.01); *F24C 15/322* (2013.01)

(58) Field of Classification Search
CPC .................................. A21B 1/48; F24C 15/322
USPC .............................................. 126/21 A, 21 R
See application file for complete search history.

(56) References Cited

U.S. PATENT DOCUMENTS

| 5,078,255 | A | 1/1992 | Haley |
| 5,243,962 | A | 9/1993 | Hwang |
| 7,107,899 | B2 * | 9/2006 | Nothum, Jr. ................. 99/443 C |
| 7,468,495 | B2 | 12/2008 | Carbone et al. |
| 7,875,834 | B2 | 1/2011 | Bujeau |

(Continued)

FOREIGN PATENT DOCUMENTS

| CH | 548161 | 4/1974 |
| EP | 1797758 | 6/2007 |

(Continued)

OTHER PUBLICATIONS

International Search Report.

(Continued)

*Primary Examiner* — Kenneth Rinehart
*Assistant Examiner* — Gajanan M Prabhu
(74) *Attorney, Agent, or Firm* — GableGotwals

(57) ABSTRACT

An improved spiral oven and method for its use includes the step of using a forward/reversing fan to produce a first airflow and a second inverted airflow in the cooking chamber. The proportion of time each airflow occurs may be unbalanced within an oven residence time or cook cycle, and either airflow may begin the cycle. In addition, the fan velocity may vary so that the speed of the first airflow is different from the speed of the second airflow. A braking resistor allows the fan to quickly changeover between full-forward and full-reverse directions, while a programmable delay limits adjustments to the heat output control method until temperature variations caused by alternating between the first direction of rotation and the second direction of rotation have stabilized. Because of the reversing airflow pattern, the product cooks more evenly across the cook belt.

11 Claims, 8 Drawing Sheets

(56) References Cited

U.S. PATENT DOCUMENTS

| | | | |
|---|---|---|---|
| 8,281,779 B2* | 10/2012 | Wiker et al. | 126/21 A |
| 8,378,265 B2* | 2/2013 | Greenwood et al. | 219/391 |
| 2007/0131215 A1* | 6/2007 | McVeagh et al. | 126/21 A |
| 2009/0181138 A1 | 7/2009 | Howard | |

FOREIGN PATENT DOCUMENTS

| | | |
|---|---|---|
| FR | 2390102 | 12/1978 |
| WO | 84/01266 | 4/1984 |
| WO | 98/12926 | 4/1998 |

OTHER PUBLICATIONS

Written Opinion of the International Searching Authority.

JBT Foodtech, "Stein GYRoCOMPACTY II-1000 Oven brochure printed off of JBT FoodTech website," JBT FoodTech.

CFS, "CFS CookStar TurboCook—High-Quality Roaster brochure printed off of CFS website," CFS.

Heat and Control Inc., "Food Processing Equipment Twin Drum Spiral Oven page printed off of Heat and Control website," Heat and Control, Inc.

Unitherm Food Systems, Inc., "Spiral Oven Systems brochure printed off of Unitherm's website," Unitherm Food Systems, Inc.

* cited by examiner

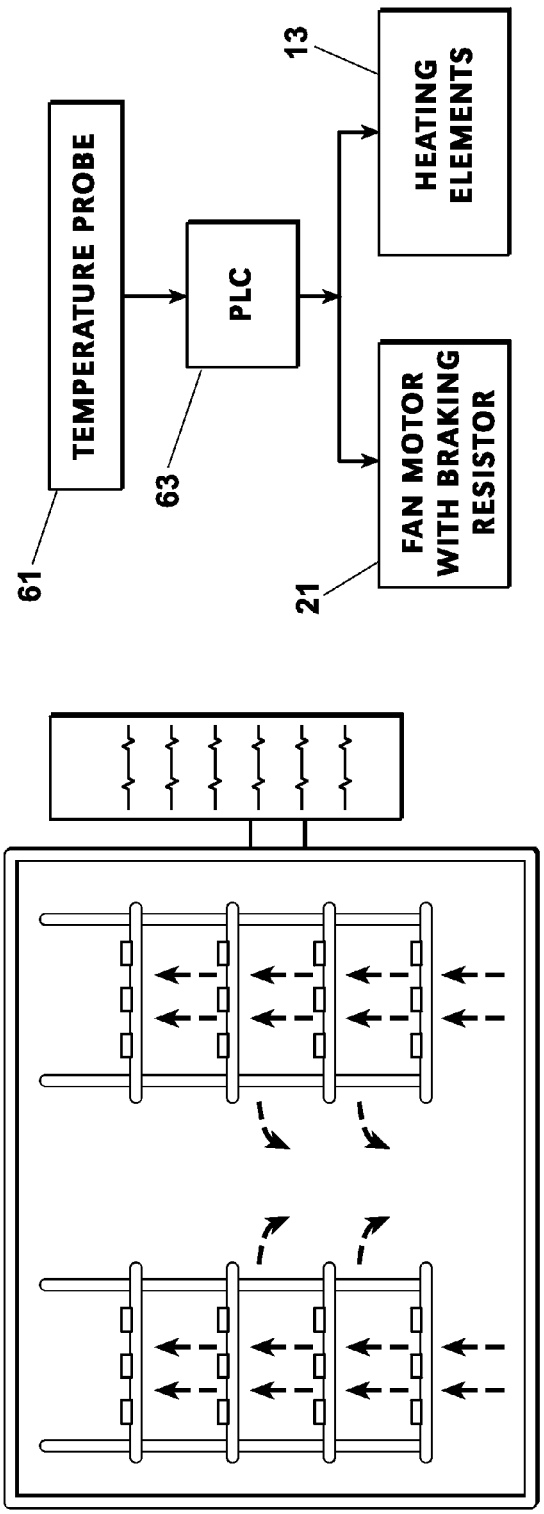
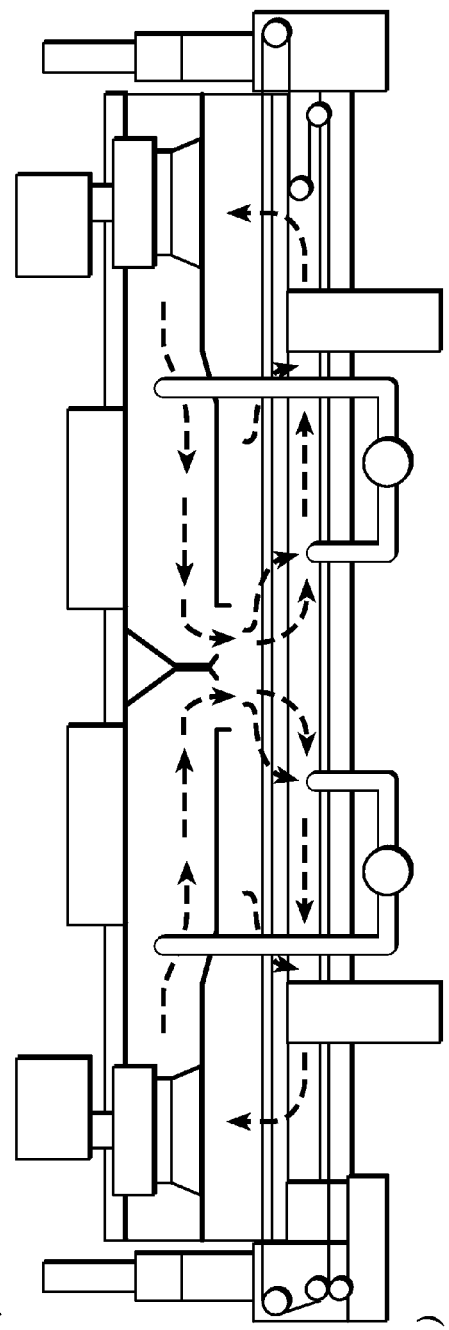
Fig. 8C
Fig. 1 (PRIOR ART)
Fig. 2 (PRIOR ART)

AIRFLOW PATTERN FOR SPIRAL OVENS

CROSS-REFERENCE TO CO-PENDING APPLICATIONS

This application is a continuation-in-part of U.S. patent application Ser. No. 13/044,370 and claims the benefit of that application.

FIELD OF THE INVENTION

This invention relates generally to spiral ovens which are used to cook large quantities of food in commercial food preparation processes. More particularly, the invention relates to apparatuses and methods to create airflow patterns within the cook chamber of a spiral oven in order to effectively and uniformly heat the product being cooked and produce a desired final cooked product appearance across the cook belt.

BACKGROUND OF THE INVENTION

Consistently creating a final, cooked product appearance that resembles one typically created in a residential oven has proven to be a far more difficult problem to solve in spiral ovens than it is in linear ovens. Linear ovens cook food using an airflow process known as impingement cooking. In impingement cooking, hot vertical airflow impinges directly upon each individual product flowing along the cook belt of the oven. Impingement cooking produces an acceptable "browned" appearance but comes at the price of increased floor space requirements. For example, a 600-foot cook belt requires 600 feet of linear oven.

Spiral ovens solve the floor space problem associated with high volume capacity cooking. A 600-foot cook belt, for example, can be compressed into a 20'×20'×20' box. However, compressing the cook belt creates problems for the heat transfer system needed to cook the product. In a linear oven, the upper surface of each product is exposed to the impingement cooking system. In a spiral oven, indirect cooking methods must be used because the upper (lower) surface of product within the spiral is hidden by the layer of cook belt and product suspended above (below) it. As a result, a product cooked in a spiral oven in no way resembles the color of the product illustrated on the package in which the product is sold. For example, a microwaveable-ready meal of macaroni-and-cheese or au gratin potatoes may appear on the package as having a golden brown finish. The actual product finish is white and anemic-looking. Microwaving by the consumer to heat the product will not change the color.

Prior art spiral ovens (see FIGS. 1 to 4) have adopted various ways to uniformly distribute and transfer heat to the product being cooked on the belt. One prior art spiral oven (FIG. 1) employs a thermal coil arrangement at one end of the oven and a fan and vent system arranged to create airflow both vertically through the belt mesh of the spiral conveyor and horizontally through the side-links of the conveyor. The fan operates in a single direction of rotation. An example of this airflow system and method is found in JBT FoodTech's (Chicago, Ill.) Stein GYROCOMPACT® 11-1000 Oven.

Another prior art spiral oven (FIG. 2) employs a first, lower section cooking zone in which heat is provided by horizontal airflow and a second, upper section cooking zone in which high-velocity hot air impinges vertically on the product being conveyed. The fan operates in a single direction of rotation. An example of this airflow system and method is found in CFS's (The Netherlands) COOKSTAR® three-zone, double-spiral cooker.

Yet another prior art spiral oven (FIG. 3) employs a cylindrical fan and air circulation system arranged to circulate air around all sides of the spiral conveyor and create airflow both horizontally across the conveyor and vertically upward through the belt mesh of the spiral conveyor. The fan operates in a single direction of rotation. An example of this airflow system and method is found in Heat and Control, Inc.'s (Hayward, Calif.) Model SO Twin Drum Spiral Oven.

A final prior art spiral oven (FIG. 4) employs a fan and air circulation system arranged to provide an airflow pattern that impinges upon the outer edge of the belt and flows horizontally across and vertically through the belt mesh of the spiral conveyor. The fan operates in a single direction of rotation. An example of this airflow system and method is found in Unitherm Food Systems, Inc's (Bristow, Okla.) spiral oven.

All prior art spiral ovens are designed to provide a substantially uniform airflow across the cook belt because conventional wisdom in the art of spiral oven design holds that a non-uniform airflow across the belt is not desirable and must be avoided.

SUMMARY OF THE INVENTION

A method of heating a food product being conveyed on a cook belt in a spiral oven includes the steps of producing a first and second airflow between an upper and lower portion of the cooking chamber of the oven, with the second airflow being inverted relative to the first. A desired cooking effect is achieved by alternating between the two airflows during a cook residence cycle. A desired effect may also be achieved by operating the spiral oven with the first airflow occurring for a different amount of time than the second airflow during the cook residence cycle. The addition of ducting or shielding can also be used in combination with the alternating first and second airflows. The first airflow also creates a horizontal flow across the cook belt predominantly at the top and bottom tiers, whereas the second airflow creates this horizontal flow predominantly in the middle tiers. The cycle can start with either the first airflow or the second airflow.

Fan speed can be controlled to increase or decrease the airflow patterns within the spiral oven. The forward/reversing fan can be prevented from running at its maximum speed when operating in the reverse direction and a braking resistor can be used so that the fan can quickly changeover between the full-forward and full-reverse directions. Because of the reversing airflow pattern, the product cooks more evenly across the cook belt than with the prior art methods.

An improved spiral oven made according to this invention has a forward/reversing fan located in an upper portion of the spiral oven and means for distributing the air produced by the fan within a cooking chamber of the spiral oven. The fan alternates between a first direction of rotation and a second direction of rotation during a timed cycle "T". The first direction of rotation may represent a greater proportion of the timed cycle T than the second direction, or the proportion of time between the two directions may be substantially even. Additionally, the first or second direction of rotation can begin the cycle. Further, the cycle can begin at the halfway point (or some other proportion of) the forward or reverse timed cycle. The fan velocity may be varied so that the speed of the airflow in the first direction of rotation is different from the speed of the airflow in the second direction of rotation. A braking resistor in communication with the fan motor allows the fan to quickly change directions, while a programmable delay limits adjustments to the heat output control method until temperature variations caused by alternating between the first and second directions of rotation have stabilized.

Objects of this invention are to (1) provide an airflow pattern within the cook chamber of a spiral oven that accounts for the unbalanced loading of product as the cook belt traverses bends within the spiral oven; (2) transfer the appropriate amount of heat to each product across the cook belt regardless of where the product is located on the belt; (3) provide uniformity of color development of product across the cook belt without degrading the CPET tray that each product may be contained within; (4) reduce or eliminate temperature differences between product located on the inside, middle and outside portions of the cook belt; and (5) provide a system and method of reversing airflow that existing ovens can take advantage of through relatively low cost retrofits.

BRIEF DESCRIPTION OF THE DRAWINGS

FIG. 1 is a prior art spiral oven that employs a thermal coil arrangement at one end of the oven and a fan and vent system arranged to create airflow vertically through the belt mesh of the spiral conveyor and horizontally through the side links of the conveyor. The fan operates in a single direction of rotation.

FIG. 2 is a prior art spiral oven that employs a first, lower section cooking zone in which heat is provided by horizontal airflow and a second, upper section cooking zone in which high-velocity hot air impinges vertically on the product being conveyed. The fan operates in a single direction of rotation.

Figure 8A:
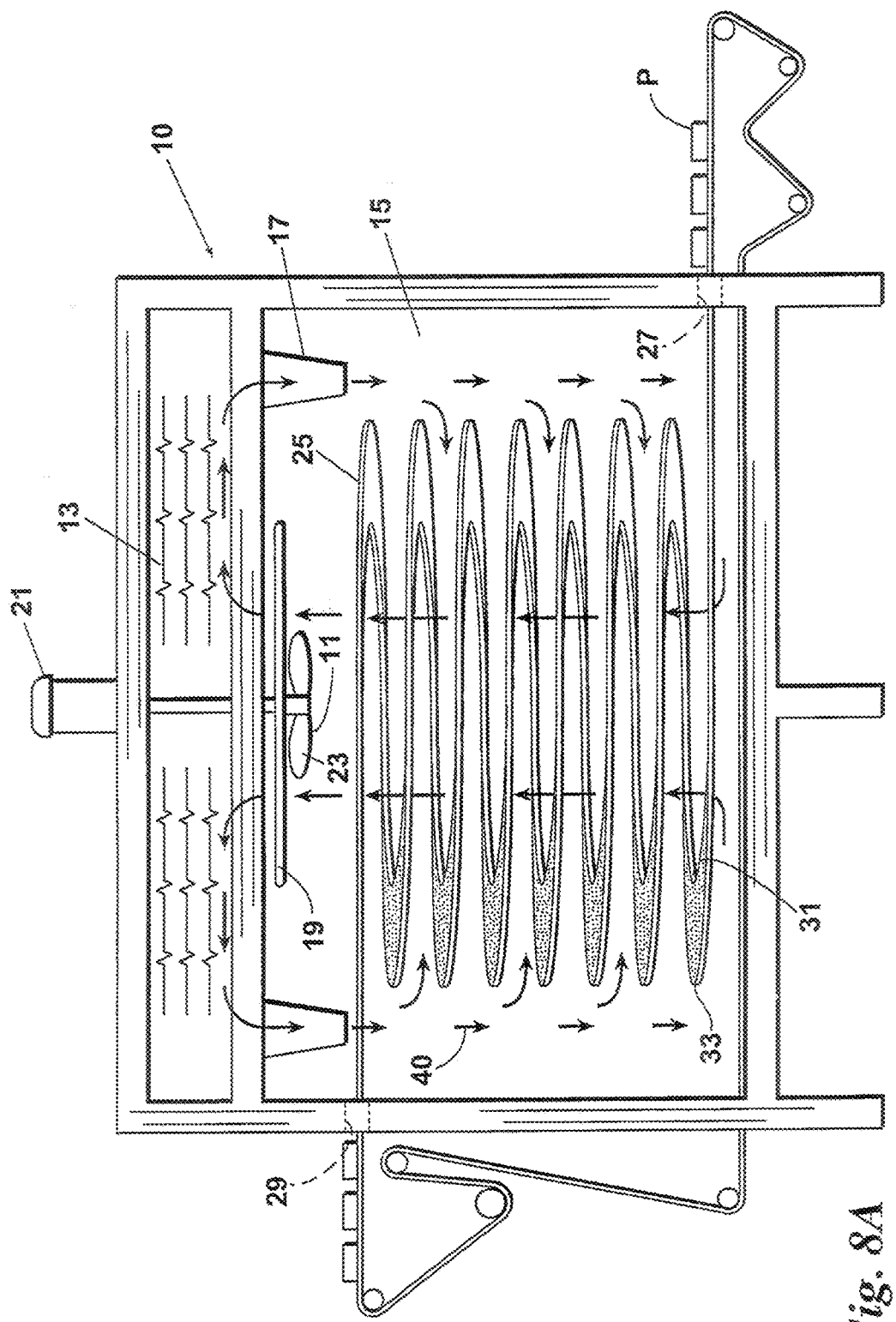
FIGS. 8A & B illustrate the airflow pattern created by a preferred embodiment of a spiral oven made and operated according to this invention. The oven includes a forward/reversing fan and vent system that provides an airflow pattern that is not uniform across the conveyer belt. The fan reverses its direction of rotation during certain time intervals to produce an inverted airflow (see FIG. 8B). Fan rotation in the forward direction may occur for a different amount of time than fan rotation in the reverse direction. Either direction may start the cycle.
Figure 8B:
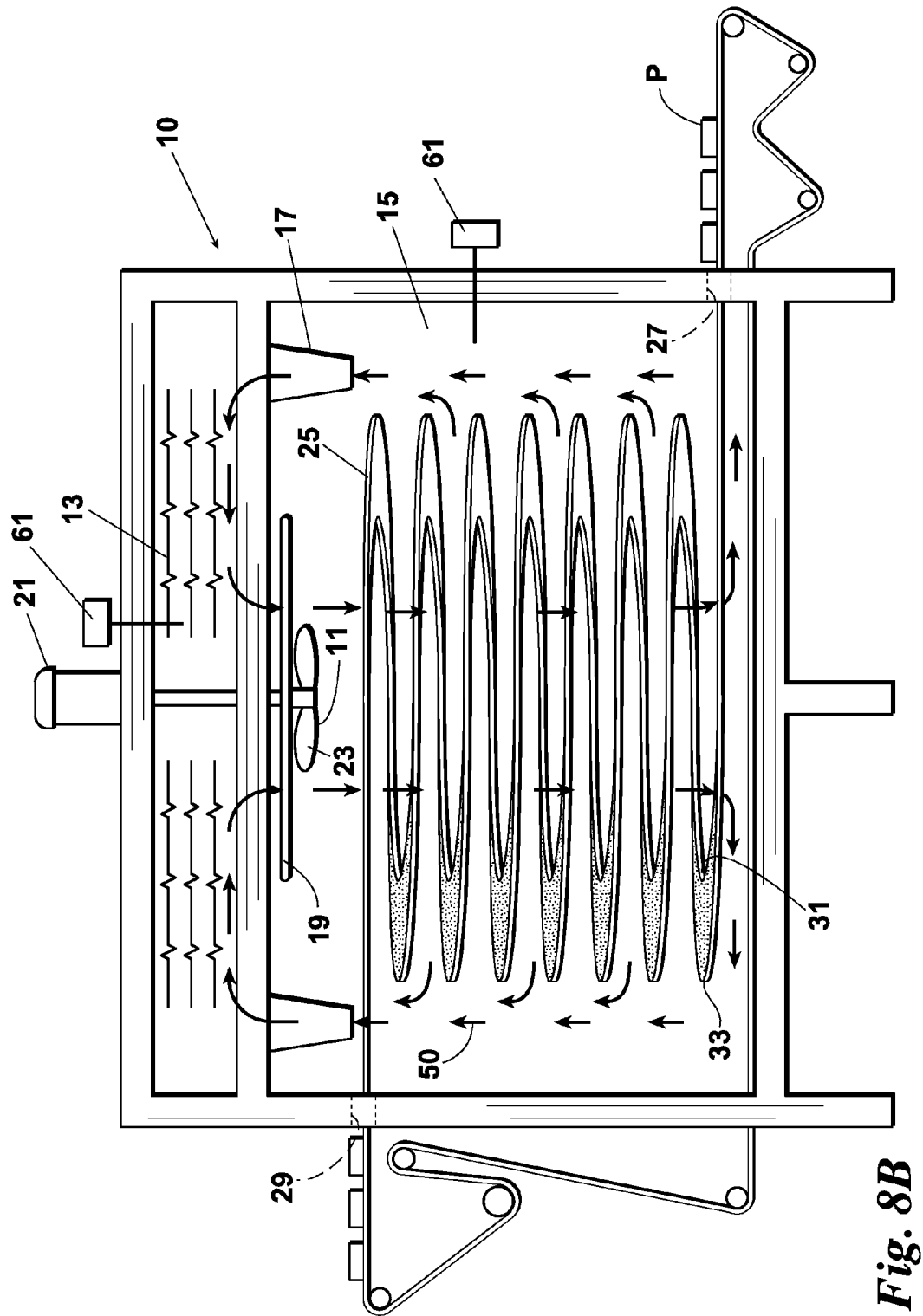
FIG. 8C is a schematic showing a programmable controller in communication with the fan motor, temperature probe and heating elements to provide a means for limiting the burner output of the elements and for causing a delay in the fan motor until airflow over the temperature probe has re-stabilized.
Figure 9:
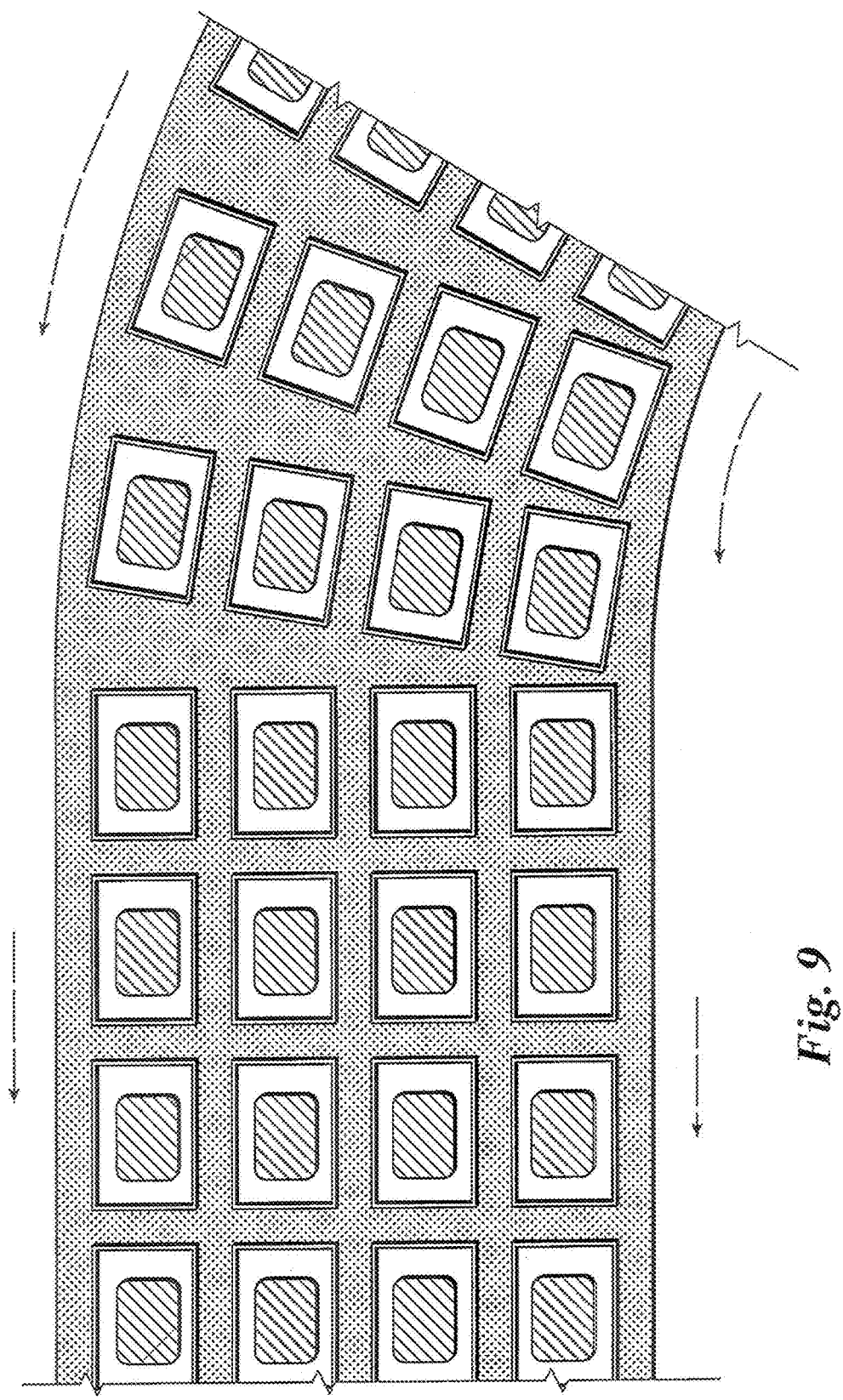
FIG. 9 illustrates the finish color of product as it exits the spiral oven of FIGS. 8A & B. Because the reversing and inverted airflow pattern accounts for the uneven product spacing, it creates a substantially uniform temperature of the finished product across the belt. Therefore, the product exiting the oven has a substantially same, golden brown finish.

| List of element numbers used in FIGS. 8A to 9. | |
|---|---|
| 10 | Spiral oven cooking system |
| 11 | Forward/reversing fan |
| 13 | Heating elements |
| 15 | Cooking chamber |
| 17 | Air cones or corner nozzles |
| 19 | Injection ring |
| 21 | Fan motor |
| 23 | Fan blades |
| 25 | Cook belt |
| 27 | Inlet opening side to 10 |
| 29 | Outlet opening side to 10 |
| 31 | Inner edge of 25 (toward center of oven) |
| 33 | Outer edge of 25 (toward walls of oven) |
| 40 | Forward airflow pattern |
| 50 | Reverse or inverted airflow pattern |
| 61 | Temperature probe |
| 63 | Programmable controller or PLC |

DETAILED DESCRIPTION OF THE PREFERRED EMBODIMENTS

A spiral oven made according to this invention creates a controlled airflow pattern that better reflects the heat transfer demands of the product being cooked in the oven. Because the product to be cooked is loaded uniformly across the width of the cook belt, prior art spiral ovens (see e.g. FIGS. 1 to 4) are designed to provide a unidirectional airflow pattern within the cooking chamber and, therefore, a substantially uniform airflow across the belt. The width of the cook belt in most commercial spiral ovens ranges between 12 and 42 inches.

Figure 3:
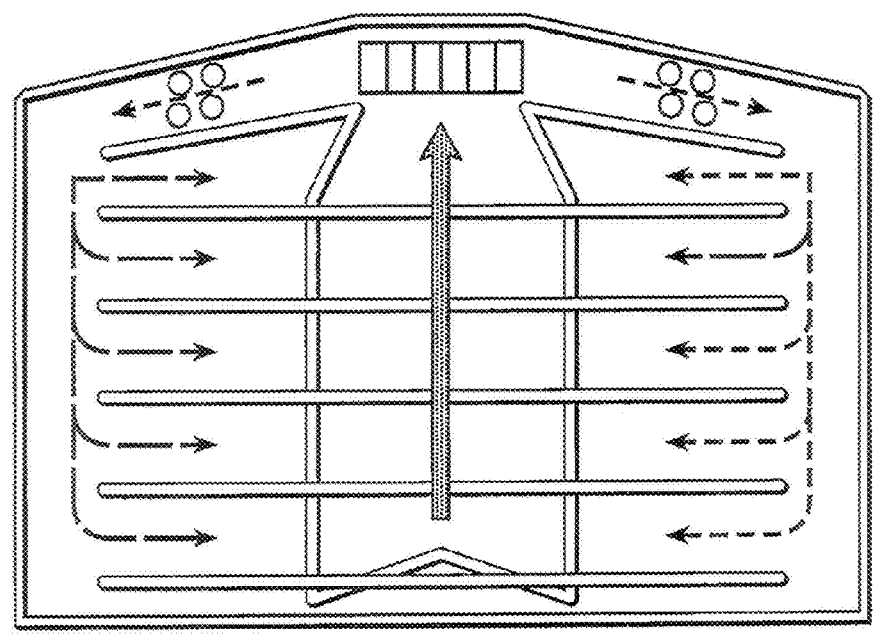
FIG. 3 is a prior art spiral oven that employs a cylindrical fan and vent system arranged to circulate air around all sides of the spiral conveyor and create airflow horizontally across the conveyor and vertically upward through the belt mesh of the conveyor. The fan operates in a single direction of rotation.
Figure 4:
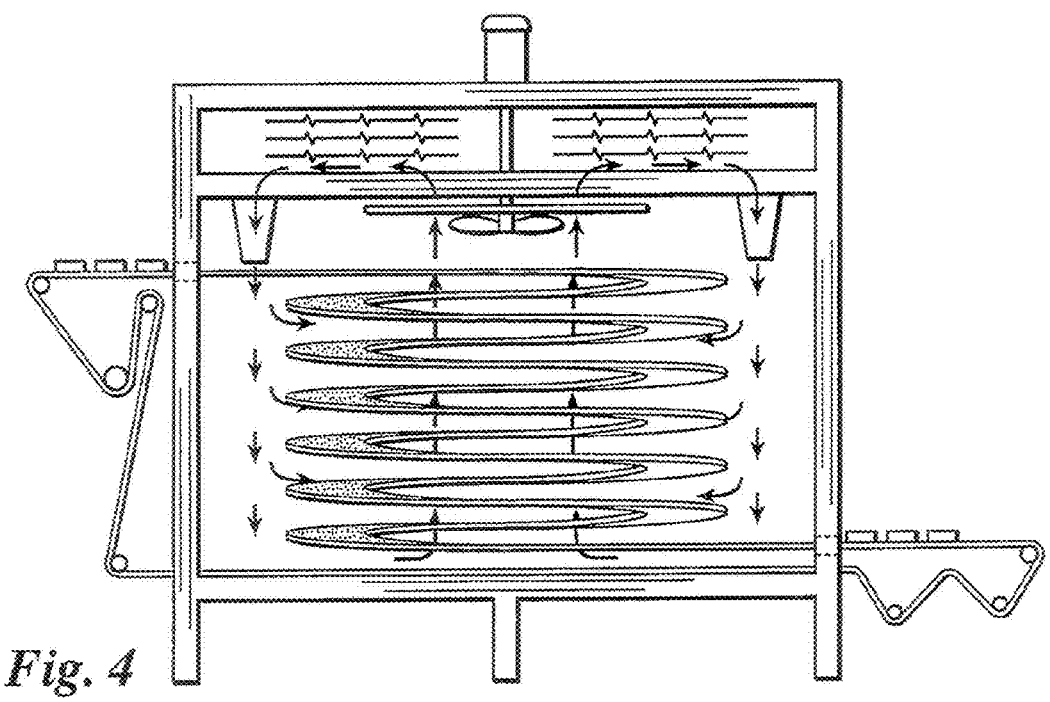
FIG. 4 is a prior art spiral oven that employs a fan and vent system arranged to arranged to provide an airflow pattern that impinges upon the outer edge of the belt and flows horizontally across and vertically through the belt mesh of the conveyor. The fan operates in a single direction of rotation.
Figure 5:
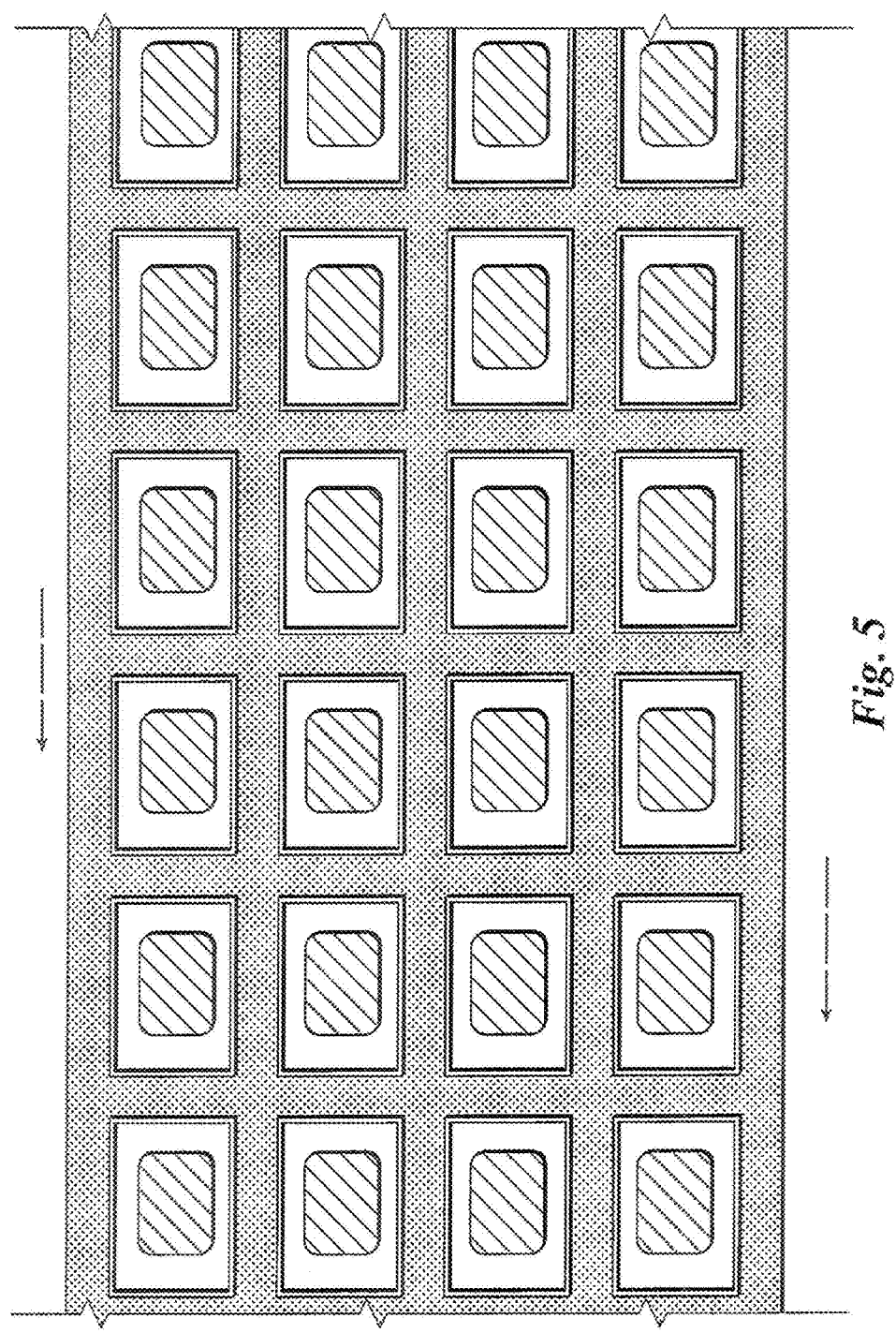
FIG. 5 illustrates the typical product spacing or loading of product entering the inlet side of a spiral oven and prior to the product encountering the first bend in the conveyor. The product is loaded into individual trays spaced substantially equidistant from one another across the belt.

Regardless of the width of the cook belt, a loading pattern must be determined relative to the size of the tray in which the product or meal to be cooked is placed. Consider a 40-inch wide cook belt loaded with trays that are 7 inches wide, 10 inches long, and 2 inches deep (see FIG. 5). The trays are typically CPET trays used for microwaveable-ready meals. If the cook belt is loaded four trays across, with the trays arranged short side leading, the longitudinal centerline of the first or inside tray is located about 5.9 inches from the inner edge of the belt (see FIG. 5). The longitudinal centerline of the second tray is located about 15.3 inches from the inner edge and the longitudinal centerline of the third tray is located about 24.7 inches from the inner edge. The fourth or outside tray is located about 34.1 inches from the inner edge (5.9 inches from the outer edge). In actual practice, the tray spacing may not be this precise, but the idea is to present products for cooking which are spaced substantially equidistant from one another on the cook belt. Each row of trays across the cook belt is also spaced substantially equidistant from the adjacent row of trays across the belt.

If the cook belt is loaded five trays across, then the longitudinal centerline of the first tray is located about 4⅓ inches from the inner edge of the belt. The longitudinal centerline of the fifth tray is located about 35⅔ inches from the inner edge. Because of this equal spacing or product loading, the uniform airflow being provided should result in equal air to and around each product and, therefore, substantially uniform heat transfer effects.

Although the above is how all prior art spiral ovens are designed to operate (and do operate), spiral ovens do not cook uniformly across the belt because a uniform airflow pattern does not take into account what happens to the product as it traverses around a spiraled cook belt. At the entrance of the spiral oven, the cook belt is a straight run and product loading across the belt is substantially equal as described above. However, once the product arrives at the first bend of the cook belt, the product spacing changes.

Figure 6:
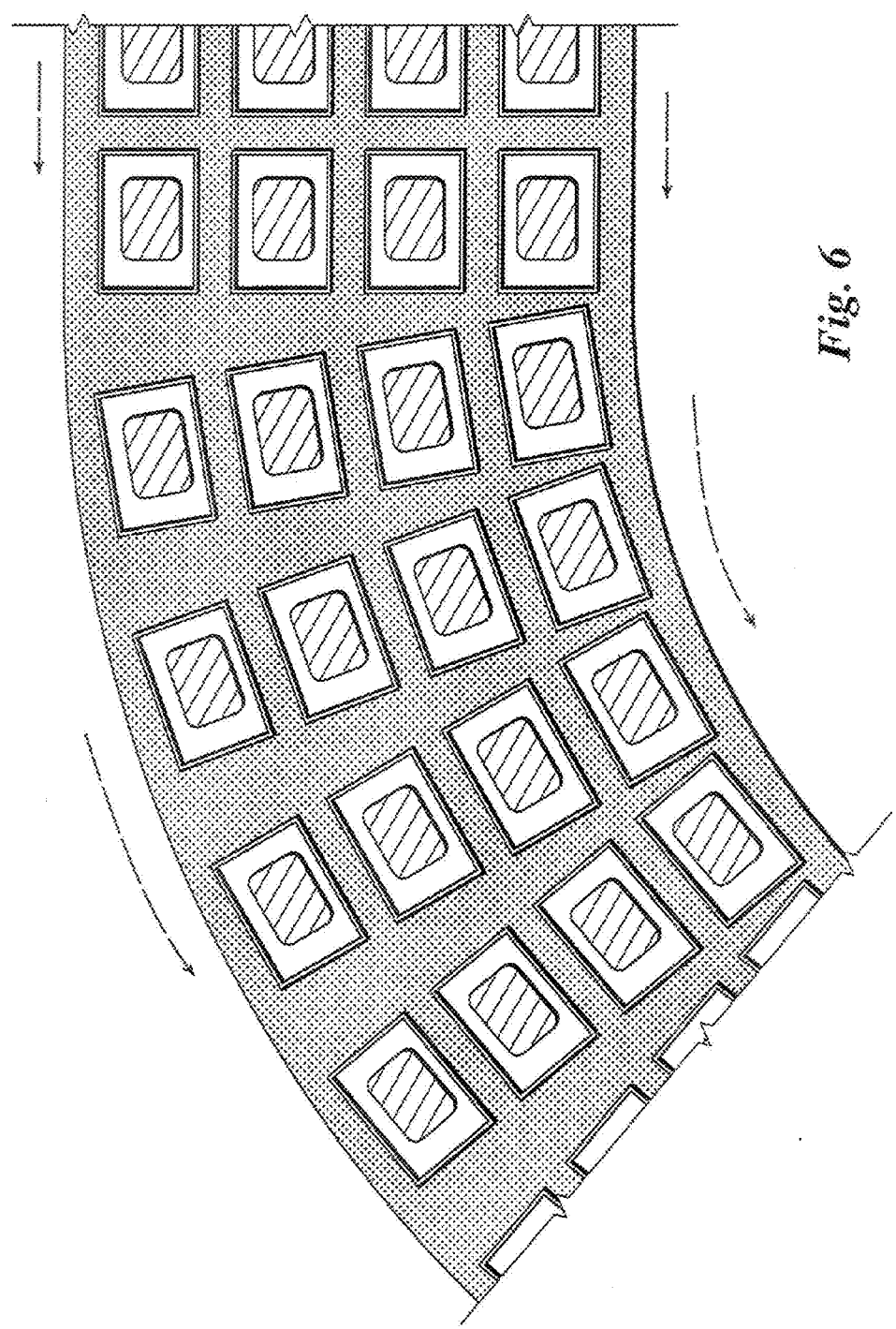
FIG. 6 illustrates the product spacing as the product of FIG. 5 traverses the first bend of a spiral oven. The belt collapses toward, the inside of the bend and the product spacing significantly changes as a result. Product located toward the inside of the belt moves closer together, thereby allowing less heat transfer, and product located toward the outside of the belt moves farther apart, thereby allowing more heat transfer.
Figure 7:
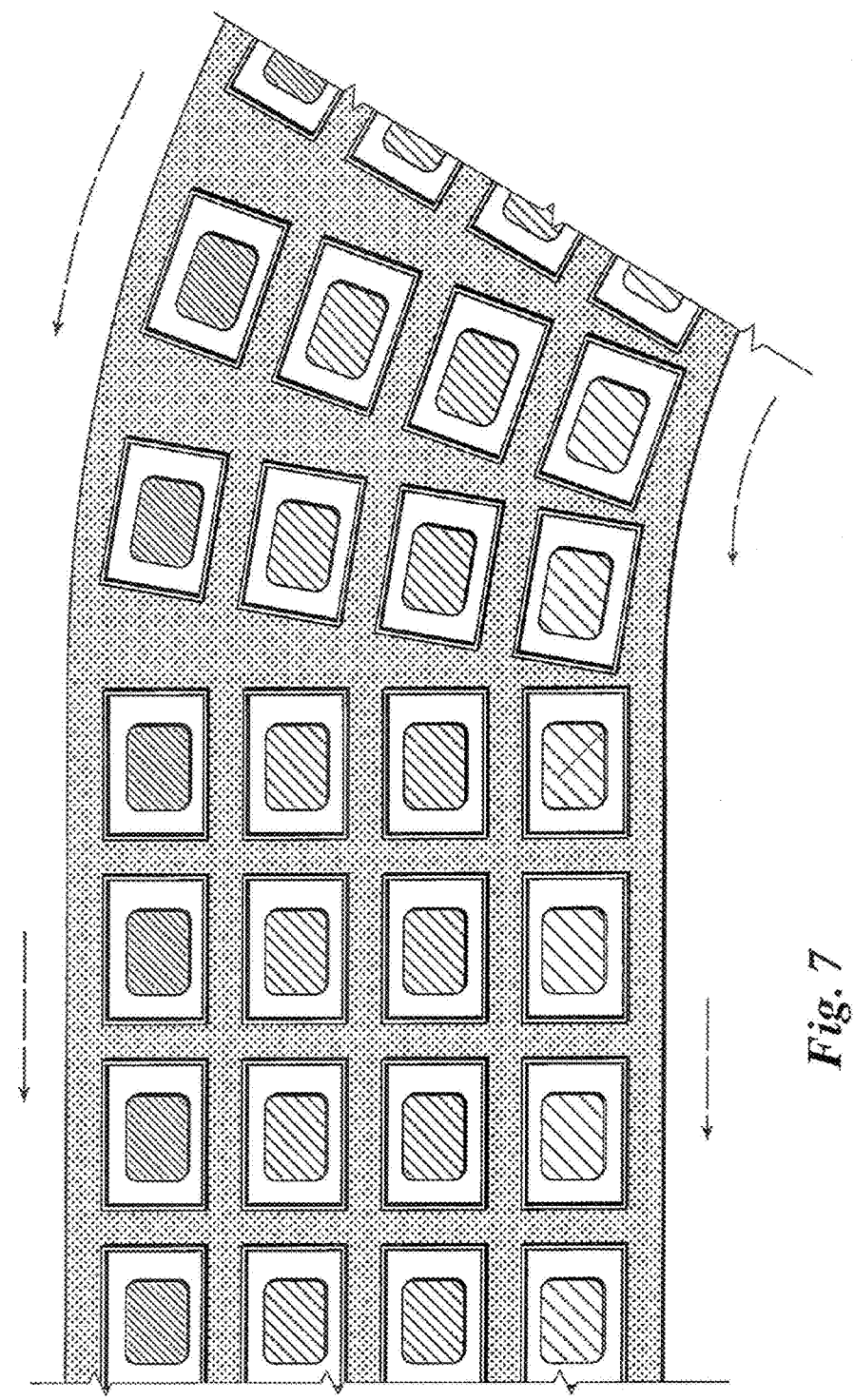
FIG. 7 illustrates the finish color of product as it exits a prior art spiral oven like those in FIGS. 1 to 4 whose cook belt has been uniformly loaded and exposed to unidirectional airflow that is intended to be uniform across the belt. Product located toward the outside of the spiral cook belt has a much darker finish than product, located toward the inside of the cook belt.

Referring now to FIG. 6, in order for the cook belt to spiral about within the interior space of the oven, the belt must collapse along its inside edge as it traverses the bend and, conversely, expand along its outside edge. This change in the cook belt results in compressed spacing of the trays located toward the inner edge of the belt and expanded spacing of the trays located toward the outer edge. Because there are no straight runs of the cook belt within the cook chamber, this changed and unequal spacing remains throughout the cook residence time. Therefore, the innermost product is shielded from the uniform airflow by the adjacent product and the outermost product is exposed to more space and airflow. Although equal air may be delivered, the deflection of the air created by the changed and unequal spacing affects the heat transfer and energy being absorbed by each product. As the products continue to progress through the oven, the outermost product experiences a lot more air and heat transfer than does the innermost product. The end result is a variation in color and browning of about two whole shades, with product located toward the inner edge of the cook belt having a white or anemic finish and product located nearer the outer edge of the cook belt having a browner finish (see FIG. 7).

Referring now to FIGS. 8A & 8B, an improved spiral oven cook system 10 uses a forward/reversing (bidirectional) fan 11 to deliver air in two different directions 40, 50 throughout a resident cook cycle, preferably in a non-even pattern. Heating elements 13 located above the fan 11 provide heated cooking medium, which is delivered into the cooking chamber 15 by way of a ducting system such as airflow cones or corner nozzles 17. The corner nozzles 17 may include deflectors (not shown) or other means for completing or partially blocking airflow. The cooking chamber may also include impingement nozzles (not shown) located directly above the cook belt. Similar to the corner nozzles 17, the impingement nozzles may also include deflectors or other means for closing the nozzles. Steam may also be introduced into the cooking chamber 15 by way of an injection ring 19 positioned between the fan 11 and the heating elements 13. Alternatively, or in addition to, steam can be injected into the cooking chamber by way of a second steam injection ring (not shown) located toward the bottom of the cooking chamber 15.

Fan 11 includes a fan motor 21 preferably equipped with a braking resistor (not shown) in order to allow fan 11 to quickly changeover between full speed forward and full speed reverse. The importance of a quick changeover between forward and reverse is discussed below. Additionally, the blades 23 of fan 11, if being used to retrofit an existing oven, will most likely require a higher pitch, than the blades of a standard forward fan typically used in spiral ovens.

The product to be cooked is loaded in trays T, which are spaced substantially evenly across the cook belt 25. The cook belt 25 is substantially a straight run on the conveyor inlet and outlet opening sides 27, 29. As is typical in spiral ovens, cook belt 25 continuously conveys the product P in trays upwardly in the cooking chamber 15 in a spiral pattern. At the same time, the fan 11, when in the forward direction, circulates the heated cooking medium within the cooking chamber 15 in a forward airflow pattern 40 (see FIG. 8A). In this airflow pattern 40, fan 11 draws the heated cooking medium upwardly from the cooking chamber 15 and the medium then flows back into the cooking chamber 15 downwardly along or toward the outer edge 33 of the cook belt 25 by way of the nozzles 17. When fan 11 is operating in the reverse direction, reverse or inverted airflow pattern 50 results (see FIG. 8B). In this airflow pattern 40, fan 11 draws the heated cooking medium upwardly along the outer edge 33 of the cook belt 25 and through the nozzles 17 and then flows the medium downwardly through the center of the cook belt 23, that is, along or toward the inner edge 31 of the cook belt 25. As the airflow pattern switches between a forward pattern 40 and reverse pattern 50, the products P are indirectly cooked as they travel upwardly through the cooking chamber 15

By providing a first, forward airflow 40 for a predetermined time "T1" and a second, inverted airflow 50 for a predetermined time "T2", heat transfer and color development are better matched to the unequal loading that occurs when cook belt 25 has collapsed toward its inner edge 31 to traverse a bend. As the experimental results below demonstrate, the temperature difference between the inside-most finished product, and the outside-most, finished product generally decreased as first airflow time T1 increased to about 80% of the total airflow cycle time, "T". Because the non-uniform, inverted airflow pattern 40, 50 accounts for the uneven product spacing, it creates a substantially uniform temperature gradient of product across the belt. Therefore, all of the product across the cook belt has a substantially same, golden brown finish (see FIG. 9). Variation in color and browning across the belt was limited to about one-half or less of a shade difference.

In the embodiment above, the fan velocity and the resulting airflow speed are the same for the first, forward airflow 40 and the second, inverted airflow 50. The fan velocity may also be configured so that the speed of the first, forward airflow 40 is different from the speed of the second, inverted airflow 50. For example, the first, forward airflow 40 may run at 80 percent of the maximum fan speed for a predetermined time T1 that is approximately 70 percent of the total airflow cycle time "T". The second, inverted airflow 50 may then run at 60 percent of the maximum fan speed for a predetermined time T1 that is approximately 30 percent of T.

Depending on the desired cook results, airflows 40 and 50 may be practiced with the addition of ducting and shielding in the spiral oven. The addition of ducting and shielding may be arranged so as to achieve a more consistent cooked product across the belt with a substantially balanced airflow between airflows 40 and 50.

Experimental Results

Reversing Fan Testing and Implementation Procedure General

A forward/reversing (bidirectional) fan was used on a Unitherm Food Systems, Inc's spiral oven ("the Unitherm spiral oven") similar to the one illustrated in FIGS. 8A & 8B to investigate the benefits of reversing the direction of airflow multiple times during the cooking process. Testing was first performed without heat, in order to compare airflow volume between a standard spiral oven (unidirectional) fan and a forward/reversing fan made according to this invention. Then, testing was performed at typical operating temperatures to determine the effects of reversing fan speed and forward-and-reverse balance on actual product.

From preliminary testing on, and experience with, spiral ovens, the inventor had learned there is a general temperature gradient across the width of the cook belt due to the net direction of airflow during circulation. A standard spiral oven fan draws air from the center of the drum and delivers the air to the cook chamber through nozzles directed toward the cook belt. The typical nozzle arrangement in combination with this airflow creates a temperature gradient, with higher temperatures experienced toward the outside of the cook belt (i.e., toward the walls of the oven) and gradually cooler temperatures experienced toward the inside of the belt (i.e., toward the center of the oven). Although this temperature gradient can be minimized through the use of several techniques, for certain products those same techniques compromise desirable attributes such as browning. The forward/reversing fan was implemented as a way to ensure the hottest air is not always delivered to the same location on the cook belt, therefore minimizing the temperature gradient across the belt while at the same time improving browning performance across the belt.

Preliminary Considerations

Upon selecting a fan blade for the forward/reversing fan, it was determined that the maximum fan flow volume of a forward/reversing fan when operating in the reverse direction and equipped with a same diameter and pitch fan blade as a standard blade, is only about 60% that of a forward-direction fan. Therefore, a fan blade with a higher pitch than a standard fan blade was selected to minimize this differential so that a seamless retrofit to an existing Unitherm spiral oven like that shown in FIG. 4 could be achieved. However, in a spiral oven built according to this invention, the fan pitch can be selected to suit the diameter of the fan. Similarly, fan speed can be controlled to increase or decrease airflow patterns. Therefore, the selected pitch angle is the one appropriate to a fan diameter and speed relevant to the desired airflow pattern. For example, selecting a different pitch angle, in turn, forces a change in the fan speed required to get the same or similar desired airflow pattern. The pitch angle could be in the range of 5 to 90%.

Other considerations in implementing a forward/reversing fan included minimizing the time needed to changeover from full-speed forward rotation to full-speed reverse rotation. Decreased changeover time is desirable to minimize the amount of time in the cooking chamber that cooked product experiences no forced airflow ("dead time"). During preliminary testing, different ramp rates in the motor drives were tried as well as the use of a braking resistor to quickly slow the rotation of the forward/reversing fan. The braking resistor proved best in decreasing and minimizing the changeover time between full-speed forward and reverse rotation.

Another consideration was the nozzle configuration. The Unitherm spiral oven included corner nozzles located toward and about the walls of the oven and directed inward and impingement nozzles located directly over the cook belt. To ensure that product throughout an oven residence cycle experienced generally the same airflow conditions, the impingement nozzles located over the belt would need to be closed fully so that the same hot air movement is experienced by product on the top tier regardless of whether a forward or reverse fan cycle occurs. For example, if the impingement nozzles located over the belt were open, the nozzles would deliver hot air directly to product on the top tier of the cook belt during the forward fan cycle but not during the reverse fan cycle. Additionally, the corner nozzles are typically fitted with deflector shields (during standard fern operation) to prevent air from being delivered directly near the outer edge of the belt. Therefore, a different nozzle configuration might prove beneficial for use with a forward/reversing fan. Those different configurations and their results are discussed below in reference to hot oven testing.

Cold Oven Testing

An initial discovery was that the forward/reversing fan with the higher pitched fan blades could not run at the same speed as a standard fan with its standard pitched fan blades. An adjustment was made through pulley ratios that allowed the forward/reversing fan to operate at its motor's designed operating speed. This had positive improvements to overall air velocity and volume. Cold airflow measurement revealed the pressure naturally developed in the cooking chamber produced nearly identical flow rates for the two styles of fan blades (standard and reversing). The pulley ratio for the standard fan gave a full speed of 1235 rpm, while the pulley ratio for the forward/reversing fan provided 864 rpm. Measureable horizontal airflow across the cook belt with the forward/reversing fan in the standard (forward) rotation was predominantly at the top and bottom sections of the tiers of the belt. When the fan direction was reversed, measureable airflow was detected in the middle-to-upper tier ranges, which provides a new location within the cooking chamber experiencing measureable airflow.

Hot Oven Testing

Hot oven testing was performed at typical operating temperatures ranging from 350° F. to 417° F. Fan speeds ranging from 864 to 950 rpm were tested. All tests were done with measurements gathered from the outside, center, and inside sections of the cook belt. Reversing cycles were set at a predetermined cycle time (e.g. 4 minutes or 240 seconds), and each cycle consisted of one forward-direction timed cycle and one reverse-direction timed cycle. For example, a 240 second, 75:25 reversing cycle meant the fan rotated in the forward direction for 180 seconds and in the reverse direction for 60 seconds.

The hot oven testing made use of temperature data logging probes and fell into one of four categories: (1) aluminum blocks (for a damping effect); (2) open-air; (3) client test product, namely, macaroni & cheese and scalloped potatoes in CPET trays, as it traversed through the oven; and (4) product temperatures taken one minute after exiting the oven in addition to a browning color test of the top surface of the product. This last category of testing used a client's conventional test methods for determining the quality of the cooked product and variation in color across the cook belt.

The first test was performed with the corner nozzle deflectors in place to direct air from the nozzles slightly away from the outer edge of the belt (i.e., toward the oven wall). A residence cycle was run with temperature probes in blocks and the forward/reversing fan in full forward direction, in full reverse direction, then in a split of 50% forward and 50% reverse balance (a 50:50 forward-reverse split). Table 1 presents the results.

The results generally indicate (1) the forward only direction mimicked what was seen with a standard fan, with the outer edge of the cook belt having the highest temperature; (2) the reverse only direction had a much higher temperature reading on the inside edge of the belt, and (3) the 50:50 forward-reverse split had a lower but still significantly higher temperature on the inside edge of the belt. From this test it was concluded that the deflectors on the corner nozzles provided a dampened forward airflow at the outside of the cook belt compared to the reversing airflow coming down the center of the drum (and along the inside of the belt). Therefore, the deflectors were removed for all subsequent testing, leaving open nozzles in the corners of the oven.

TABLE 1

Baseline Probe Temperature Differences in ° F. for Forward Only, Reverse Only, and 50:50 Forward/Reverse Cycle with Corner Nozzle (Bottom Hole, Top Slot) Deflectors Directing Air away from Outside Edge of Cook Belt and Impingement Deflectors Fully Closed.

| Reversals and Cycle Time | Fan Setting | Temp. (° F.) | Humidity (%) | Fan Speed (% max/rpm) | Residence Time (min.) | Probe Temperature Outside Probe | Center Probe | Inside Probe | Range in Probe Temp. |
|---|---|---|---|---|---|---|---|---|---|
| — | Forward only | 415 | 55 | 100/1202 | 39 | — | — | — | — |
| 0 reversals 240 sec. | Forward only | 350 | 0 | 79/950 | 8 | 181 | 173 | 174 | 8 |
| | | | | 78/936 | | 182 | 162 | 165 | 20 |
| | Reverse only | 350 | 0 | 78/936 | 8 | 156 | 175 | 211 | -55 |
| | | | | | | 157 | 176 | 207 | -50 |
| 4 reversals 240 sec. | 50:50 w/ reverse start | 350 | 0 | 78/936 | 8 | 168 | 173 | 194 | -26 |
| | 50:50 w/ forward start | 350 | 0 | 78/936 | 8 | 165 | 170 | 188 | -23 |
| | 50:50 w/ forward start | 350 | 0 | 78/936 | 8 | 164 | 169 | 180 | -16 |

A series of tests were then performed in which the percentage balance of forward/reverse time was adjusted. The results of those tests are shown in Table 2. With the oven configuration determined, a 50/50 split still resulted in a higher inside belt temperature, albeit less than with the deflectors in place. Forward rotation time was increased for a given cycle until a temperature

TABLE 2

Baseline Probe Temperature Differences in ° F. for Various Forward/Reverse Fan Settings with Corner Nozzle Deflectors Open and Impingement Deflectors Fully Closed.

| Reversals and Cycle Time | Fan Setting | Temp. (° F.) | Humidity (%) | Fan Speed (% max/rpm) | Residence Time (min.) | Probe Temperature Outside Probe | Center Probe | Inside Probe | Range in Probe Temp. |
|---|---|---|---|---|---|---|---|---|---|
| *Large blocks to match large trays* | | | | | | | | | |
| 4 w/ fwd. start 240 sec. | 50:50 | 350 | 0 | 78/936 | 8 | 164 | 169 | 180 | -16 |
| | 75:25 | 350 | 0 | 78/936 | 8 | 172 | 173 | 182 | -10 |
| | | | | | | 170 | 162 | 187 | -25 |
| | | | | | | 167 | 166 | 184 | -18 |
| | 80:20 | 350 | 0 | 78/936 | 8 | 182 | 173 | 176 | 9 |
| | | | | | | 167 | 163 | 169 | -6 |
| | | | | | | 169 | 165 | 170 | -5 |
| 16 w/ fwd. start 240 sec. | 81.25:18.75 | 350 | 0 | 78/936 | 8 | 170 | 165 | 169 | 5 |
| | | | | | | 173 | 166 | 171 | 7 |
| *Open-Air Measurement* | | | | | | | | | |
| 16 w/ fwd. start 263 sec. | 81:19 | 385 | 0 | 78/936 | 35 | 320 | 310 | 328 | -18 |
| | | | | 70/840 | | 316 | 302 | 315 | 14 |
| *Small blocks to match small trays* | | | | | | | | | |
| 7 w/ rev. start 234 sec. | 70:30 | 395 | 0 | 70/840 | 27 | 289 | 284 | 297 | -13 |
| | 75:25 | | | | | 290 | 286 | 296 | -10 |
| | 80:20 | | | | | 290 | 282 | 296 | -14 | probe differential of less than 7° F. was achieved at an oven temperature of 350° F. (with a balance of about 81% forward time and 19% reverse time). A similar test was conducted with open-air temperature measurements. The results shown in Table 2 provided a baseline starting point for product testing.

Product testing was performed with macaroni & cheese in CPET trays and au gratin potatoes, also in CPET trays. Selected oven temperature and residence time were selected to replicate the temperature and residence time used by the client when cooking those particular products. Temperature probes were buried in the center of the product to monitor temperature throughout the residence cycle. Incremental product temperature data were collected after exiting the oven. Tables 3 and 4 present the results. Note that in some tests the cycle started with a reverse airflow and in others the cycle started with a forward airflow. The conclusion was that product temperature and browning (color) difference were minimized at a fan direction balance of 80% forward rotation and 20% reverse direction within an oven residence cycle.

TABLE 3

Product Temperatures of Macaroni & Cheese Cooked in Small and Large Trays under Replicated Client Oven Temperatures and Residence Cycle Time.

| Reversals and Cycle Time | Fan Setting | Temp. (° F.) | Humidity (%) | Fan Speed (% max/ rpm) | Residence Time (min.) | Time after Exit (min.) | Probe Temperature Outside Probe | Probe Temperature Center Probe | Probe Temperature Inside Probe | Range in Probe Temp. |
|---|---|---|---|---|---|---|---|---|---|---|
| Large trays ||||||||||||
| 10 w/ rev. start 234 sec. | 60:40 80:20 65:35 | 417 395 | 0 | 70/840 | 39 | — | 192 183 162 | 169 173 159 | 188 165 163 | 19 18 −4 |
| Small trays ||||||||||||
| 7 w/ rev. start 234 sec. | 65:35 70:30 80:20 | 395 | 0 40 | 70/840 100/864 | 27 27 | — | 156 160 187 | 164 155 180 | 169 165 179 | −13 −10 8 |
| 7 w/ fwd start 234 sec. | 80:20 | 395 | 40 | 100/864 | 27 | — 1 2 3 4 | 183 187 184 178 172 | 180 183 183 181 179 | 180 182 181 179 175 | 3 5 3 2 7 |
| Small blocks to match small trays ||||||||||||
| 7 w/ fwd. start 234 sec. | 80:20 | 395 | 0 40 | 100/864 | 27 | — | 300 302 | 291 295 | 298 302 | 9 7 |

TABLE 4

Product Temperatures of Au Gratin Potatoes Cooked in Large Tray under Replicated Client Oven Temperatures and Residence Cycle Time. Product Entering Oven at Halfway Point of Forward Cycle.

| Reversals and Cycle Time | Fan Setting | Temp. (° F.) | Humidity (%) | Fan Speed (% max/ rpm) | Residence Time (min.) | Time after Exit (min.) | Probe Temperature Outside Probe | Probe Temperature Center Probe | Probe Temperature Inside Probe | Range in Probe Temp. |
|---|---|---|---|---|---|---|---|---|---|---|
| About 10 234 sec. | 80:20 | 395 | 40 | 100/864 | 38 | — | 176 | 172 | 179 | −7 |

Another test using client product was performed at Unitherm, Inc.'s test facility (Bristow, Okla.) with scalloped potatoes in CPET trays using the client's standard temperature measurement methods and browning/color visual approval. This test used a 40% water vapor in addition to the oven temperature cooking. A forward/reverse cycle percentage of 70:30 was selected for a starting point. The product temperature differentials observed across the cook belt are not solely the result of the cook conditions. Product characteristics, which are beyond the experimenter's control, are a source of variance, even within a single lane of product on the cook belt.

Table 5 presents the temperature data of product cooked in the Unitherm test oven prior to its retrofit with the forward/reversing fan. The temperature of the cooked product was taken approximately one minute after leaving the oven. The variation in product temperature across the belt, as measured by the range in temperatures, is about 10% of the average product temperature, with product travelling in the inside lanes about 15° F. cooler on average than product travelling in the outside lane.

TABLE 5

Scalloped Potato Product Temperature Data in ° F. for Non-Reversing Fan Operating at 1235 rpm, Oven Temperature at 385° F., Humidity 40% and Residence Time of 32 minutes.

| | Product Temperature by Lane (1 = outside lane, 4 = inside lane) | | | | Lane 1-4 | Total | Coefficient of Variation |
|---|---|---|---|---|---|---|---|
| Sample | 1 | 2 | 3 | 4 | Δ Temp. | Range | (%) |
| A | 165.8 | 151.8 | 160.5 | 156.6 | 9.2 | 14.0 | 8.8 |
| B | 169.8 | 146.8 | 160.1 | 147.8 | 22.0 | 23.0 | 14.7 |
| C | 165.4 | 161.6 | 157.4 | 142.3 | 23.1 | 23.1 | 14.7 |
| D | 169.1 | 158.0 | 159.3 | 145.7 | 23.4 | 23.4 | 14.8 |
| E | 160.3 | 151.0 | 157.7 | 151.0 | 9.3 | 9.3 | 6.0 |
| F | 155.5 | 148.5 | 152.5 | 147.6 | 7.9 | 7.9 | 5.2 |
| G | 164.1 | 156.6 | 161.9 | 151.5 | 12.6 | 12.6 | 7.9 |
| H | 162.0 | 157.6 | 159.8 | 146.7 | 15.3 | 15.3 | 9.8 |
| Average | 164.0 | 154.0 | 158.6 | 148.6 | 15.4 | 15.4 | 9.9 |

Tables 6 & 7 present the temperature data of product cooked in the test oven after its retrofit with the forward/ reversing fan. As before, the temperature of the cooked product was taken approximately one minute after leaving the oven. The coefficient of variation in product temperature across the belt, as calculated by the range in product temperatures relative to the average product temperature, is about half that experienced in the forward only fan arrangement (about 4 to 5% compared to 10% with the forward only fan). Similarly, the difference in product temperature between product travelling in the inside lane and outside lane is about half that experienced in the forward only fan arrangement (about 4 to 8° F. compared to 15° F.). Within the forward/reversing fan arrangement, variation in product temperature increased as total residence time decreased. For example, a 36 minute residence time resulted in about a 4% coefficient of variation whereas a 38 minute residence resulted in about a 5% coefficient of variation However, in both cases, color was a 3 to 4, closer to a 4, with the inside lane darkest by a half shade and middle lanes the lightest. In other words, the shading difference was limited to about a half shade or less.

TABLE 6

Scalloped Potato Product Temperature Data in ° F. for 70/30 Forward/Reversing Fan Cycle at 864 rpm, Oven Temperature at 395° F., Humidity 40% and Residence Time of 38 minutes.
10 cycles of 228 seconds each (160 seconds forward/68 seconds reverse)

| Sample | Product Temperature by Lane (1 = outside lane, 4 = inside lane) | | | | Lane 1-4 Δ Temp. | Total Range | Coefficient of Variation (%) |
|---|---|---|---|---|---|---|---|
| | 1 | 2 | 3 | 4 | | | |
| A | 185.6 | 181.1 | 183.0 | 184.0 | 1.6 | 4.5 | 2.5 |
| B | 185.1 | 183.8 | 182.4 | 178.6 | 6.5 | 6.5 | 3.6 |
| C | 178.3 | 175.8 | 173.6 | 176.1 | 2.2 | 4.7 | 2.7 |
| D | 183.8 | 167.3 | 176.0 | 177.1 | 6.7 | 16.5 | 9.4 |
| Average | 183.2 | 177.0 | 178.8 | 179.0 | 4.2 | 6.2 | 3.5 |

Changes were then made in an attempt to decrease browning. Fan speed was decreased to 778 rpm and residence time was increased one minute to 37 minutes. Table 8 presents the results. Color was again a 3 to 4, closer to a 4, with the inside lane darkest by a half shade and middle lanes the lightest. The cooked product was considered the best looking cooked product in comparison to the previous tests, with product on the inside lane being darker than in the previous runs. However, the trays started to slightly deform at these settings. For example, the long side of some of the trays, most likely those travelling on the inside lane, began to droop. Therefore, experiments were made to the forward/reverse balance adjustment.

TABLE 7

Scalloped Potato Product Temperature Data in ° F. for 70/30 Forward/Reversing Fan Cycle at 864 rpm, Oven Temperature at 395° F., Humidity 40% and Residence Time of 36 minutes.
9 cycles of 240 seconds each (168 seconds forward/72 seconds reverse)

| Sample | Product Temperature by Lane (1 = outside lane, 4 = inside lane) | | | | Lane 1-4 Δ Temp. | Total Range | Coefficient of Variation (%) |
|---|---|---|---|---|---|---|---|
| | 1 | 2 | 3 | 4 | | | |
| A | 174.9 | 161.9 | 169.6 | 164.6 | 10.3 | 13.0 | 7.7 |
| B | 173.6 | 172.5 | 170.5 | 169.9 | 3.7 | 3.7 | 2.2 |
| C | 173.0 | 159.9 | 169.0 | 163.4 | 9.6 | 13.1 | 7.9 |
| Average | 173.8 | 164.8 | 169.7 | 166.0 | 7.9 | 9.1 | 5.4 |

TABLE 8

Scalloped Potato Product Temperature Data in ° F. for 70/30 Forward/Reversing Fan Cycle at 778 rpm, Oven Temperature at 395° F., Humidity 40% and Residence Time of 37 minutes.
9 cycles of 247 seconds each (173 seconds forward/74 seconds reverse)

| Sample | Product Temperature by Lane (1 = outside lane, 4 = inside lane) | | | | Lane 1-4 Δ Temp. | Total Range | Coefficient of Variation (%) |
|---|---|---|---|---|---|---|---|
| | 1 | 2 | 3 | 4 | | | |
| A | 175.7 | 162.6 | 176.1 | 176.1 | −0.4 | 13.5 | 7.8 |
| B | 169.9 | 153.1 | 164.3 | 159.8 | 10.1 | 16.8 | 10.4 |
| Average | 172.8 | 157.9 | 170.2 | 168.0 | 4.9 | 15.0 | 8.9 |

Tables 9 and 10 present the results of changing the forward/reverse balance to about 70:30. Given the same residence time, temperature variability increased as the amount of forward rotation slightly increased to 72% from 70% of the total cycle. In these tests, the color had improved between the inside and outside (about a 3-4 closer to a 4), middle two lanes were 3, but the outside lane was clearly hotter. Testing was concluded here.

TABLE 9

Scalloped Potato Product Temperature Data in ° F. for 70/30 Forward/Reversing Fan Cycle at 864 rpm, Oven Temperature at 390° F., Humidity 40% and Residence Time of 37 minutes.
9 cycles of 247 seconds each (173 seconds forward/74 seconds reverse)

| Sample | Product Temperature by Lane (1 = outside lane, 4 = inside lane) | | | | Lane 1-4 Δ Temp. | Total Range | Coefficient of Variation (%) |
|---|---|---|---|---|---|---|---|
| | 1 | 2 | 3 | 4 | | | |
| A | 177.5 | 165.8 | 169.9 | 164.5 | 13.0 | 13.0 | 7.7 |
| B | 172.4 | 166.7 | 169.9 | 168.3 | 4.1 | 5.7 | 3.4 |
| C | 167.3 | 160.5 | 165.0 | 162.0 | 5.3 | 6.8 | 4.2 |
| D | 180.0 | 167.3 | 163.7 | 169.3 | 10.7 | 16.3 | 9.6 |
| Average | 174.3 | 165.1 | 167.1 | 166.0 | 8.3 | 9.2 | 5.5 |

TABLE 10

Scalloped Potato Product Temperature Data in ° F. for 72/28 Forward/Reversing Fan Cycle at 864 rpm, Oven Temperature at 390° F., Humidity 40% and Residence Time of 37 minutes.
9 cycles of 247 seconds each (178 seconds forward/69 seconds reverse)

| Sample | Product Temperature by Lane (1 = outside, 4 = inside lane) | | | | Lane 1-4 Δ Temp. | Total Range | Coefficient of Variation (%) |
|---|---|---|---|---|---|---|---|
| | 1 | 2 | 3 | 4 | | | |
| A | 184.5 | 170.4 | 175.8 | 171.4 | 13.1 | 14.1 | 8.0 |
| B | 182.4 | 166.3 | 171.7 | 169.7 | 12.7 | 16.1 | 9.3 |
| Average | 183.5 | 168.4 | 173.8 | 170.6 | 12.9 | 15.1 | 8.7 |

A person of ordinary skill in the art would understand that the addition of ducting or shielding in the spiral oven could allow balanced or more balanced forward-reverse cycles to be run yet still achieve substantially the same or similar result as the unbalanced forward-reverse cycles tested here.

Additional System Changes

The operating program for the UNITHERM™ spiral oven retrofitted with the forward/reversing fan was modified to accommodate the reversing fan option. The modified algorithm allowed a user to select a desired residence time and a forward/reverse tan direction balance based on percentage. The algorithm then automatically determined a cycle time and forward/reverse intervals to ensure that for a given residence time, all product experienced the same quantity of forward and reverse airflow throughout its cook process. The determined cycle time is the anticipated minimum time for one direction of rotation to be considered effective.

Additionally, it was found that during the change of direction of the fan blade, temperatures could fluctuate until the airflow re-stabilized. A moving average temperature display was integrated so that a temperature more representative of an oven cycle temperature was displayed. In addition, the first, forward airflow 40 generally has a higher temperature than the second, inverted airflow 50. Upon reading the lower temperature, the temperature probe sends a signal to the temperature control loop to increase burner output. The increased burner output causes the overall temperature profile of the oven to "spike," which may negatively affect cook yield, quality, color, moisture content, and product uniformity. In order to prevent these spikes, the temperature of the air passing over the temperature probe must have time to reach equilibrium when the direction of the fan blade changes. However, the integrity of the temperature probe and temperature control loop at other times during the cooking cycle must also be maintained. In order to address both issues, a programmable delay was incorporated into the heat output control method (see FIG. 8C). The programmable delay 63 limits burner response until airflow over the temperature probe 61 has re-stabilized, at which point the temperature control loop can once again control the output of the burner.

Lastly, a breaking resistor was determined to be a permanent addition to the reversing fan implementation because reducing the time taken to reverse rotation proved beneficial by greatly reducing dead time.

While preferred embodiments of a spiral oven cooking system equipped with a forward/reversing fan and a method for its use have been described in detail, changes can be made in the details of its construction and use without departing from the scope of its claims.

What is claimed is:

1. An improved air flow system for heating a food product being conveyed on a spiraled cook belt through a cooking chamber of a spiral oven, the improvement comprising:
   a forward/reversing fan arranged above and concentric to the spiraled cook belt, the forwarding/reversing fan having plurality of fan blades and a braking resistor and producing a first airflow in a first rotational direction flowing between an upper and lower portion of the cooking chamber and a second airflow in a second rotational direction flowing between the upper and lower portion of the cooking chamber;
   a temperature probe in communication with a temperature control loop and a burner, the temperature control loop controlling an output of the burner; and
   means for limiting the burner output during a transition between the first airflow and the second airflow, the limiting means temporarily preventing the temperature control loop from controlling the burner output until an airflow over the temperature probe has re-stabilized;
   wherein the first rotational direction is vertically downward along and in contact with an inside edge of the cook belt, laterally across the cook belt from the inside edge to an outside edge of the cook belt, and vertically upward along and in contact with the outside edge of the cook belt, the second rotational direction being inverted relative to that of the first rotational direction.

2. A system according to claim 1 wherein the limiting means is a programmable delay.

3. An improved air flow system according to claim 1 further comprising a pitch of the plurality of fan blades being arranged to provide when in the second rotational direction a maximum fan flow volume greater than 60% of a maximum flow volume provided when in the first rotational direction.

4. An improved air flow system according to claim 1 wherein at least a portion of the first airflow exits one or more nozzles located in a corner of the cooking chamber, and at least a portion of the second airflow enters the one or more nozzles, the one or more nozzles arranged such that the portions of the first and second airflows entering and exiting respectively are not restricted by a deflector.

5. A method of heating a food product being conveyed on a cook belt in a spiral oven, the method comprising the steps of:
   exposing a row of product as it travels through the spiral oven to a first airflow and a second airflow, both airflows being produced by a forward/reversing fan having a plurality of fan blades and a braking resistor and arranged above and concentric to the cook belt;
   controlling the exposure of the row of product to the first and second airflows by using at least one of an amount of time the row of product is exposed to the first airflow and to the second airflow, ducting of at least one of the first and second airflows, and shielding of at least one of the first and second airflows; and
   delaying adjustments to a heat output control method after changing between the first and second airflows until an airflow over a temperature probe has re-stabilized;
   wherein the first rotational direction is vertically downward along and in contact with an inside edge of the cook belt, laterally across the cook belt from the inside edge to and outside edge of the cook belt, and vertically upward along and in contact with the outside edge of the cook belt, the second rotational direction being inverted relative to that of the first rotational direction.

6. A method according to claim 5 further comprising the step of controlling the speed of the forward/reversing fan so that the first airflow and the second airflow have different velocities.

7. A method according to claim 5 wherein a pitch of the plurality of fan blades being arranged to provide when in the second rotational direction a maximum fan flow volume greater than 60% of a maximum flow volume provided when in the first rotational direction.

8. A method according to claim 5 wherein at least a portion of the first airflow exits one or more nozzles located in a corner of the cooking chamber, and at least a portion of the second airflow enters the one or more nozzles, the one or more nozzles arranged such that the portions of the first and second airflows entering and exiting respectively are not restricted by a deflector.

9. An improved spiral oven having at least one fan located above and concentric to a cook belt of the spiral oven, and means for distributing air produced by the at least one fan within a cooking chamber of the spiral oven, the improvement comprising the at least one fan being a forward/reversing fan having a plurality of fan blades and equipped with a braking resistor and alternating between a first direction of rotation and a second direction of rotation during a timed cycle "T"; and including means that causes a delay between the said directions of rotation until an airflow has stabilized over a temperature probe;

wherein an airflow in the first direction of rotation has a different speed than an airflow in the second direction of rotation; and wherein the first rotational direction is vertically downward along and in contact with an inside edge of the cook belt, laterally across the cook belt from the inside edge to an outside edge of the cook edge, and vertically upward along and in contact with the outside edge of the cook belt, the second rotational direction being inverted relative to that of the first rotational direction.

10. An improvement according to claim 9 wherein a pitch of the plurality of fan blades is arranged to provide when in the second rotational direction a maximum fan flow volume greater than 60% of a maximum flow volume provided when in the first rotational direction.

11. An improvement according to claim 9 further comprising one or more nozzles located in at least one corner of the cooking chamber and arranged so at least a portion of the first airflow exits the one or more nozzles and at least a portion of the second airflow enters the one or more nozzles, the one or more nozzles being further arranged such that the portions of the first and second airflows entering and exiting respectively are not restricted by a deflector.

* * * * *